(No Model.)  G. LANSELL.  6 Sheets—Sheet 1.
APPARATUS FOR EQUALIZING THE STRAIN ON WINDING GEAR.
No. 404,292. Patented May 28, 1889.
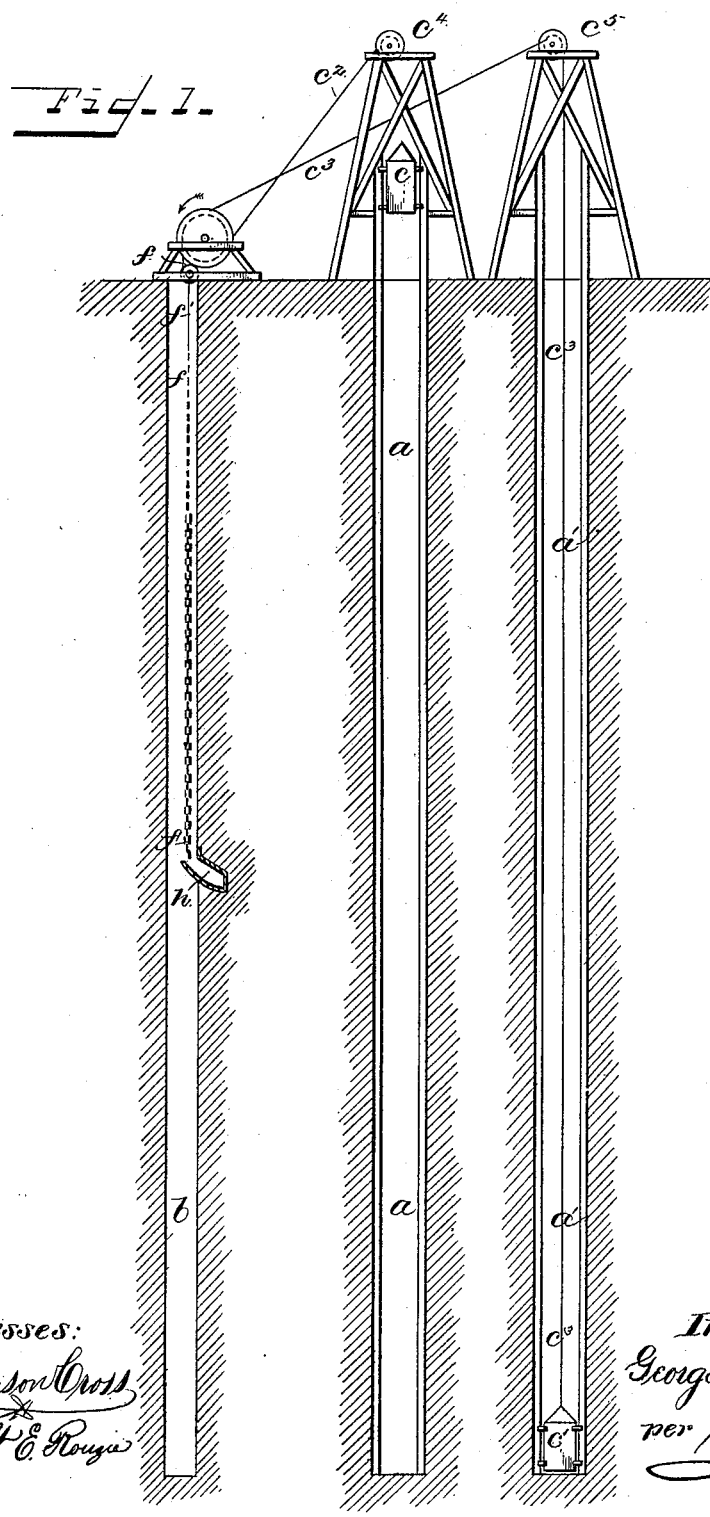

(No Model.)  G. LANSELL.  6 Sheets—Sheet 2.
APPARATUS FOR EQUALIZING THE STRAIN ON WINDING GEAR.
No. 404,292. Patented May 28, 1889.
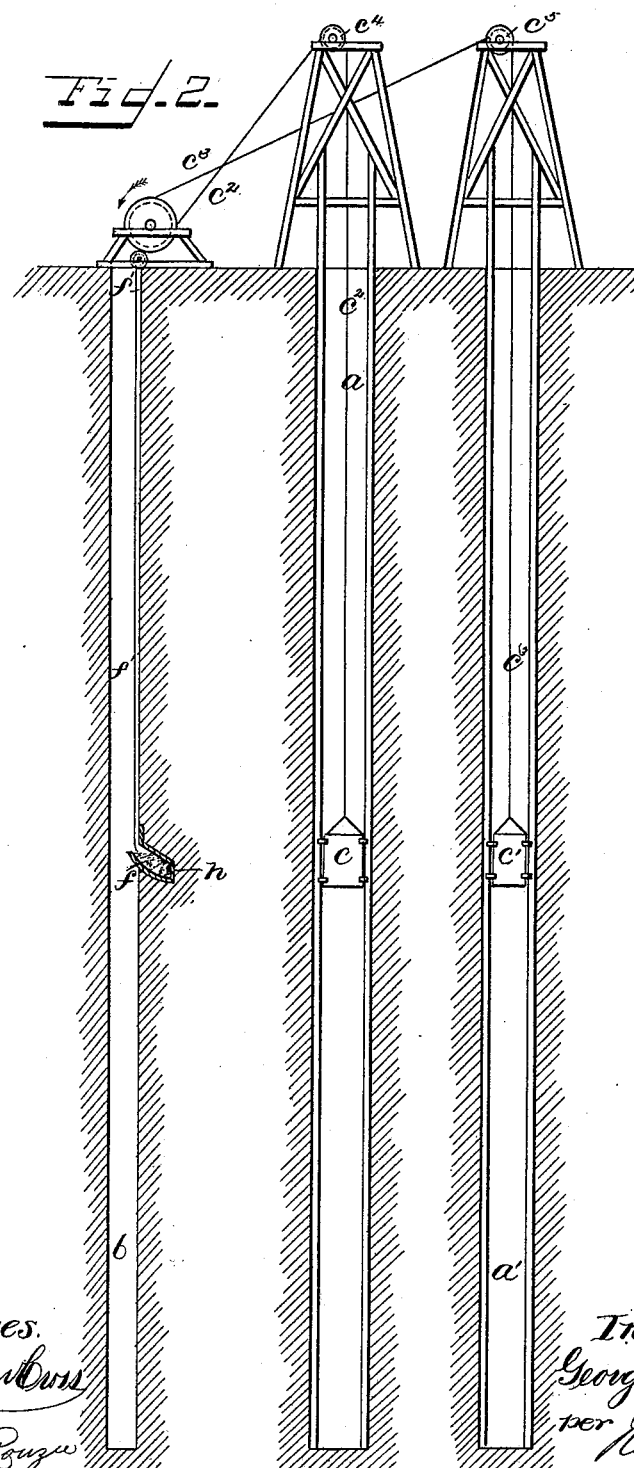

(No Model.) G. LANSELL. 6 Sheets—Sheet 3.
APPARATUS FOR EQUALIZING THE STRAIN ON WINDING GEAR.
No. 404,292. Patented May 28, 1889.
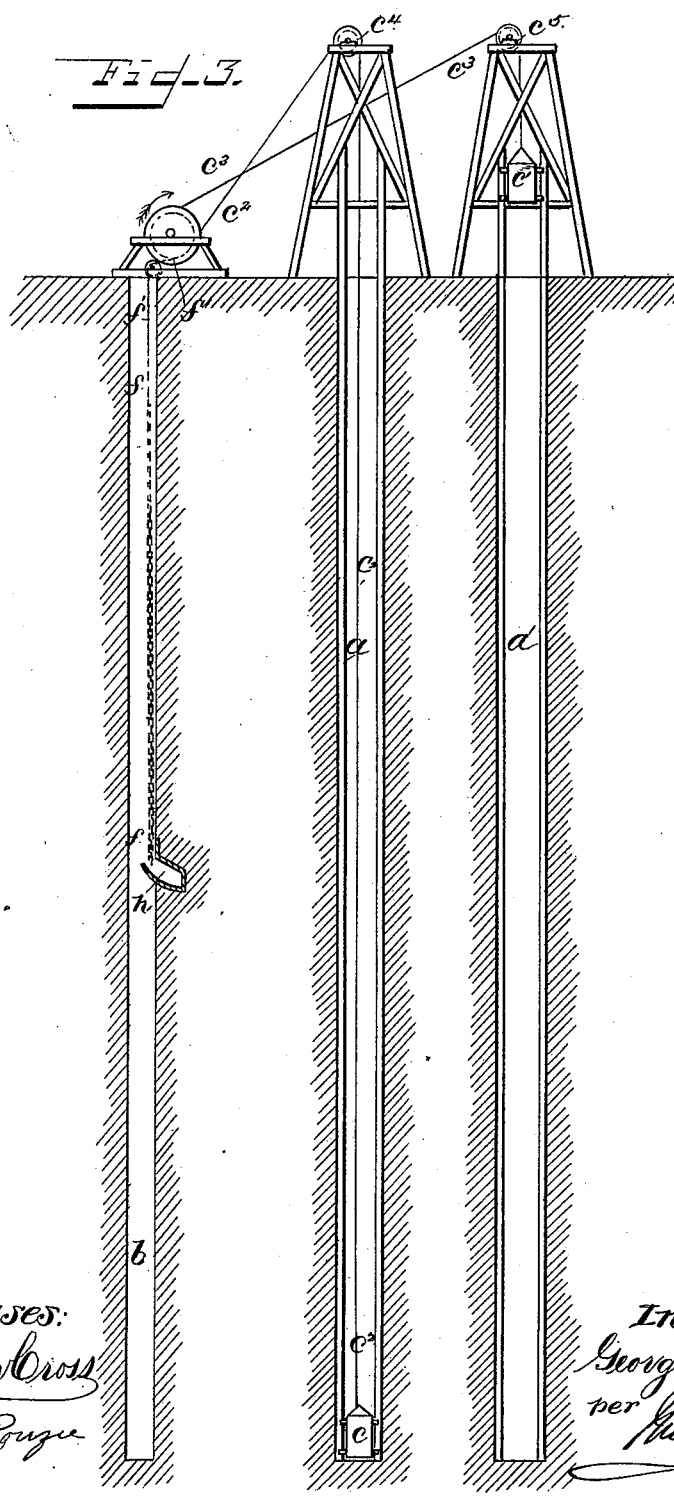

(No Model.) G. LANSELL. 6 Sheets—Sheet 4.
APPARATUS FOR EQUALIZING THE STRAIN ON WINDING GEAR.
No. 404,292. Patented May 28, 1889.
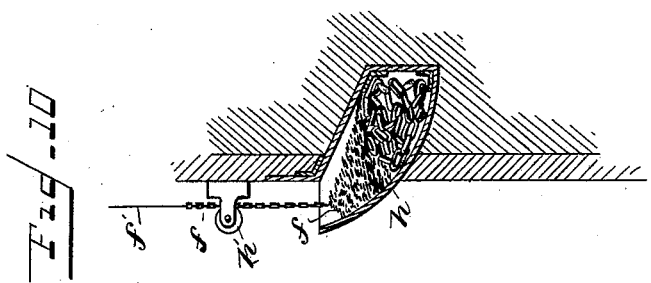
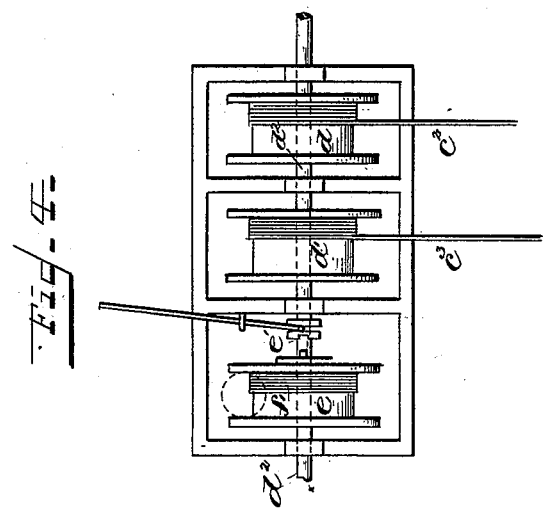
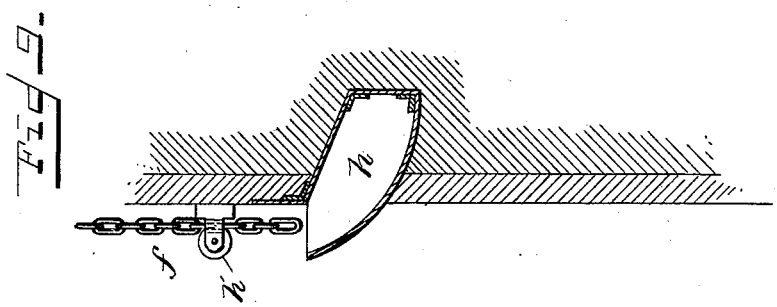
Witnesses:
J. Thomson Cross
Milt. E. Rouzee
Inventor:
George Lansell
per
Henry Orth
Attorney.

(No Model.) 6 Sheets—Sheet 5.
G. LANSELL.
APPARATUS FOR EQUALIZING THE STRAIN ON WINDING GEAR.
No. 404,292. Patented May 28, 1889.
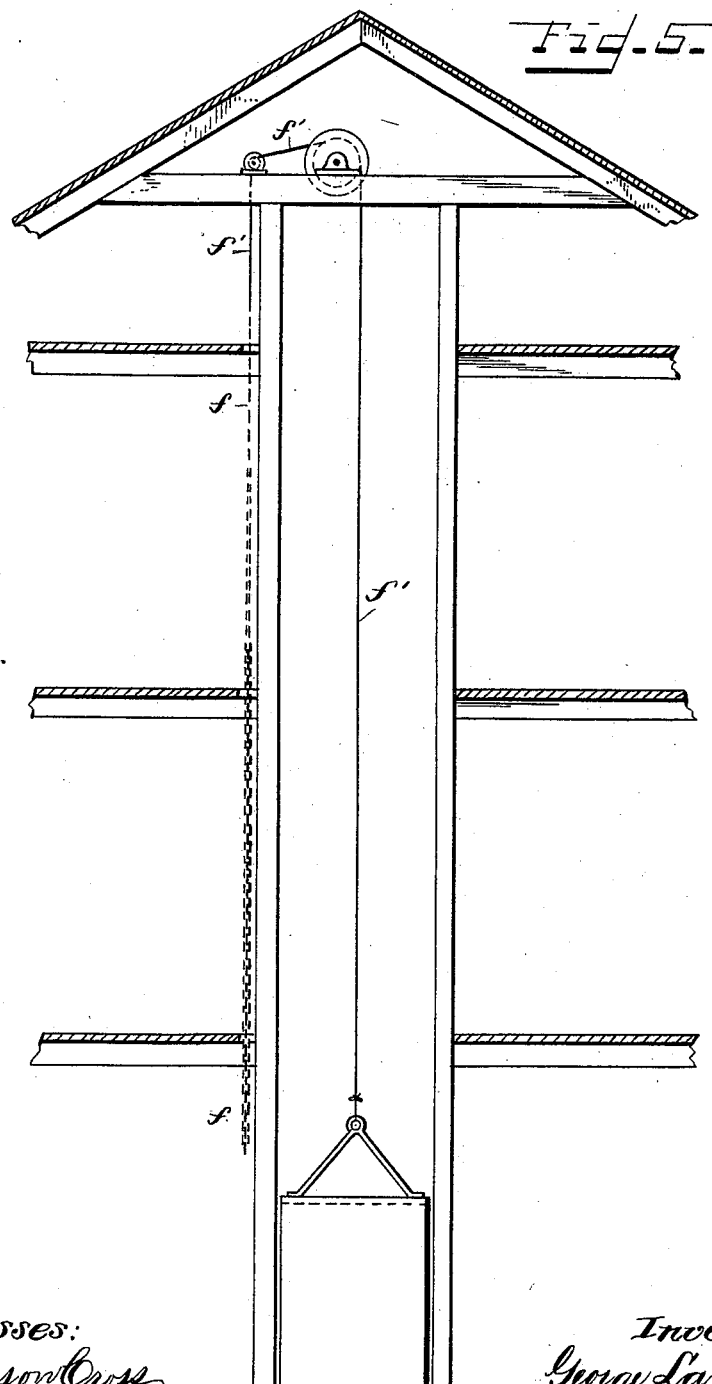

(No Model.) 6 Sheets—Sheet 6.
G. LANSELL.
APPARATUS FOR EQUALIZING THE STRAIN ON WINDING GEAR.
No. 404,292. Patented May 28, 1889.
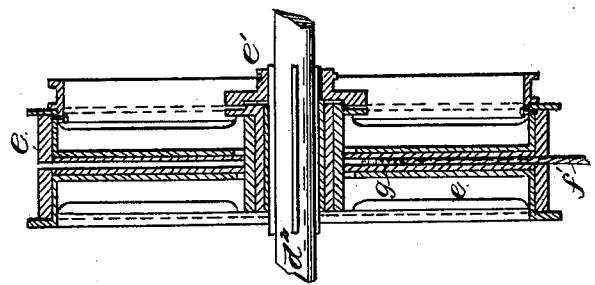
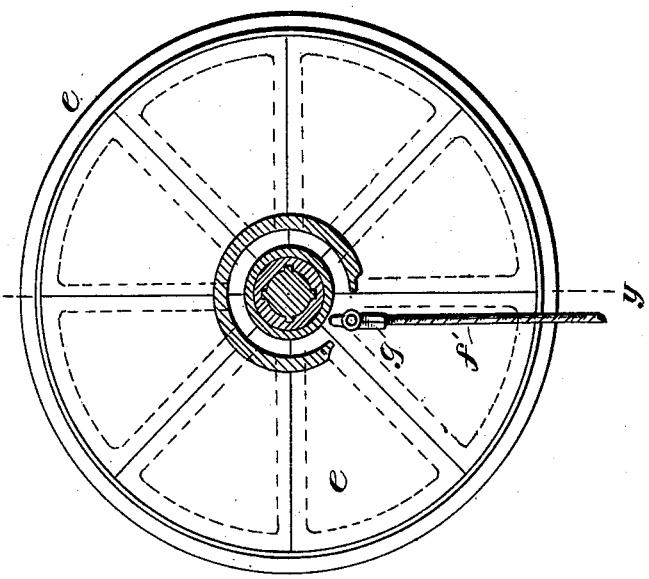
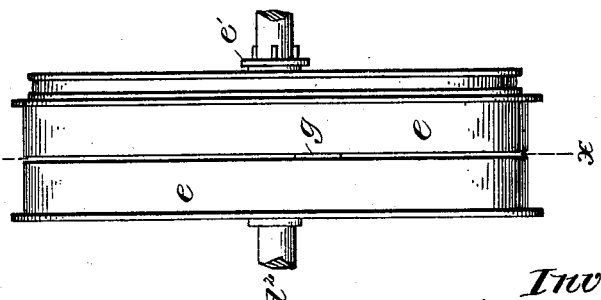
Witnesses:
J. Thomson Cross
Milt. E. Rouzee
Inventor:
George Lansell
per
Henry Orr
Att'y

UNITED STATES PATENT OFFICE.

GEORGE LANSELL, OF SANDHURST, VICTORIA.

APPARATUS FOR EQUALIZING THE STRAIN ON WINDING-GEAR.

SPECIFICATION forming part of Letters Patent No. 404,292, dated May 28, 1889.

Application filed June 23, 1888. Serial No. 277,959. (No model.) Patented in Victoria November 25, 1887, No. 5,468; in New South Wales November 28, 1887, No. 358; in Queensland January 14, 1888; in New Zealand January 27, 1888, No. 2,768; in England February 20, 1888, No. 2,519; in South Australia May 12, 1888, No. 1,022; in Tasmania May 12, 1888, No. 572/10; in Belgium June 21, 1888; in France August 30, 1888; in Italy September 1, 1888, and in India September 20, 1888, No. 383.

*To all whom it may concern:*

Be it known that I, GEORGE LANSELL, quartz miner, a subject of the Queen of Great Britain, residing at Fortuna Crushing Works, Sandhurst, in the British Colony of Victoria, have invented new and useful Improvements in Apparatus for Equalizing the Strain on Winding-Gears, such as are used in mining-shafts and warehouse-lifts, (for which I have obtained Letters Patent in the following countries, to wit: in France, under date of August 30, 1888, unnumbered; in Belgium, under date of June 21, 1888, unnumbered; in Italy, under date of September 1, 1888, unnumbered; in India, under date of September 20, 1888, No. 383; in Victoria, under date of November 25, 1887, No. 5,468; in New South Wales, under date of November 28, 1887, No. 358; in New Zealand, under date of January 27, 1888, No. 2,768; in South Australia, under date of May 12, 1888, No. 1,022; in Tasmania, under date of May 12, 1888, No. 572/10; and for which I have made applications for patents, on which the patents have not been granted, in the following countries: in Austria, Spain, Canada, (date of filing unknown,) and Great Britain, under date of February 20, 1888, No. 2,519, and in Queensland, under date of January 14, 1888,) of which the following is a full, clear, and exact description of the invention, which will enable others skilled in the art to which it appertains to make and use the same.

My invention relates to improvements in apparatus for equalizing the strain on winding-gears, such as are used in mining-shafts and warehouse-lifts; and it consists, mainly, in coupling the shaft of an auxiliary winding drum or spider to the shaft of the main winding-gears, and in attaching to this auxiliary drum or spider a rope or chain of increasing weight to act as a counterpoise to the cage and haulage-rope. This rope or chain hangs down either the pump-shaft or down a blind shaft or bore-hole arranged at any convenient position adjacent to the winding-gears.

In the accompanying drawings, Figures 1, 2, and 3 are sectional diagrams illustrating my invention. Fig. 4 is a plan of the winding-gear, showing my improvements applied thereto. Fig. 5 is a diagram illustrating the application of my invention to a warehouse-lift. Fig. 6 represents a front elevation of my auxiliary drum or spider. Fig. 7 is a vertical section on line $xx$, Fig. 6. Fig. 8 is a vertical section on line $yy$, Fig. 7. Fig. 9 is a vertical section of a receptacle for the counterpoise-chain hereinafter described; and Fig. 10 is a similar view to Fig. 9, but showing the chain in the receptacle.

$a\,a'$ represent the shafts of a mine, and $b$ the pump-shaft.

$c\,c'$ are the cages, having haulage-ropes $c^2$ $c^3$, respectively, attached thereto, passing over guide-pulleys $c^4\,c^5$, respectively, and leading to the main drums $d\,d'$, Fig. 4, respectively, of the winding-gear.

$e$ is the auxiliary drum or spider, mounted upon the shaft $d^2$ of the winding-gear, and so arranged that it may be coupled thereto, either automatically or otherwise, as may be desired, by any suitable device, such as a clutch-coupling, $e'$.

$f$ is the counterbalance-chain, which is made in lengths, the weight of each of which is relatively greater than the weight of the length next above it. The upper end of this counterpoise-chain is secured to a comparatively light rope, $f'$, passing around and secured to the auxiliary drum or spider $e$ by means of the pivoted clip $g$, Fig. 6, which admits of the rope being wound in reverse directions, as may be required.

$h$ is a receptacle formed in the side of the pump or equivalent shaft, and arranged to receive the counterbalance-chain $f$ when the same is lowered.

$h'$ is a small guide-wheel arranged above the receptacle $h$ to guide the counterbalance-chain into the said receptacle, as illustrated in Figs. 9 and 10. As shown in Figs. 1 to 3, this guide-wheel $h'$ may, however, be dispensed with, as it is not absolutely necessary.

The operation of my invention is as follows: Assuming the parts to be in the position shown in Fig. 1, motion is transmitted to the winding-gear in the direction indicated by the arrow, thus raising the cage $c'$ and at the same time lowering the cage $c$ and counterbalance-chain $f$ until the various parts assume the position indicated in Fig. 2—that is to say, until the two cages $c$ and $c'$ are at an equal height in their respective shafts and the counterbalance-chain $f$ has all been lowered into its receptacle $h$ and the rope $f'$ has been unwound to its fullest extent. If motion continues to be imparted to the driving-gears in the same direction, the parts will assume the positions indicated in Fig. 3—that is, the cage $c'$ will be drawn up, the cage $c$ lowered, the counterpoise-chain $f$ drawn out of the receptacle $h$, and the whole of the rope $f'$ again wound upon the drum or spider $e$, but in the contrary direction—that is, whereas at the commencement of the operation the rope $f'$ was wound upon the auxiliary drum in such a direction that it caused the chain $f$ to act as a counter-balance to the haulage-rope $c^3$ of the cage $c'$, yet when the parts assume the position indicated in Fig. 3 the chain will act as a counter-balance to the haulage-rope $c^2$ of the cage $c$, because when the parts were in the position indicated in Fig. 2 the winding of the rope $f'$ on the auxiliary drum or spider $e$ was reversed by reason of its end being connected to the pivoted clip $g^2$, Fig. 6, which is arranged to swing over as the winding continues and allow the rope $f'$ to be wound upon the drum or spider $e$ in the reverse direction.

It will be obvious that I may employ an ordinary drum to act as my auxiliary drum, as indicated in Fig. 4; but I prefer to construct this portion of my apparatus as illustrated in Figs. 6, 7, and 8, and I prefer to provide the same with a strap-brake and with a clutch-coupling device, $e'$, for connecting the same to the main driving-shaft, upon which, as hereinbefore mentioned, it is arranged.

The application of my invention to a warehouse-lift will be readily understood by reference to Fig. 5, wherein the rope $f'$ of the counterbalance-chain $f$ is simply wound in the reverse direction upon a suitable drum attached to the main shaft of the winding-gear, and is so arranged that when the haulage-rope is lowered to its fullest extent—that is, when the greatest weight has to be counterbalanced—the chain $f$ will be drawn up from off the ground, and thus its whole weight will be acting as a balance to the rope and cage.

If preferred, I may employ a shorter counterbalance-chain by winding the same upon a drum of smaller diameter and by arranging a receptacle at a suitable height similar to the arrangement shown in Figs. 1 to 3; but of course in this case the counterbalance-chain would have to be made correspondingly stout in order to obtain the necessary weight to counterbalance the main winding-rope.

I have found when employing the improved drum or spider constructed as illustrated in Figs. 6, 7, and 8 that for use in a mine having, say, a two-thousand-two-hundred-feet shaft it is preferable to construct the rope for supporting the counterbalance-chain of eleven hundred feet of one-inch wire rope, while the counterbalance-chain I construct of one hundred feet of five-eighths-inch chain, one hundred and fifty feet of three-fourths-inch chain, and three hundred and twenty feet of seven-eighths-inch chain, the total weight of which will be approximately thirty-five hundred-weight; but of course it is obvious that I may vary these proportions and dimensions as found desirable, and indeed it is necessary to vary these proportions and dimensions in order to suit the different sizes of auxiliary drums employed. For instance, when employing an ordinary drum of the same size as the main driving-drum, as illustrated in Figs. 1 to 4, it would be necessary to employ a chain and rope which together are equal in length to the travel of the cage; but, as hereinbefore mentioned, if a smaller auxiliary drum be employed then a shorter length of rope will suffice, but the counterbalance-chain must be proportionately heavy.

It is obvious that the employment of an auxiliary drum and counterbalance-chain constructed as herein specified is a great safeguard against overwinding, because the various parts may be so arranged that there shall be great power exerted by the counterbalance-chain and auxiliary drum when the cages are nearing the end of their travel, and this will be especially the case when employing an auxiliary drum constructed as shown in Figs. 6, 7, and 8, because as the rope is wound upon the said drum each convolution of the said rope increases in diameter. Thus the counterbalance-chain has more effect on the axle of the driving-gear, and this, combined with the increase in weight of the counterbalance-chain, renders overwinding almost an impossibility.

I do not desire to claim, broadly, a flexible counterpoise as a means to counterbalance the haulage rope or ropes, or such rope or ropes and the cage suspended therefrom, as I am aware that this has been done before, my invention being an improvement on such means.

Having now particularly described and explained the nature of my said invention and in what manner the same is to be performed, I declare that what I claim is—

1. The combination, with a vertically-movable body and the haulage-rope from which said body is suspended, of a like movable flexible body composed of sections of increasing weight, the aggregate weight of the sections being equal to that of the haulage-rope and the body suspended therefrom, said bodies being arranged to move simultaneously, but in opposite directions, substantially as and for the purposes specified.

2. The combination, with a vertically-movable body and the haulage-rope from which said body is suspended, of a like movable flexible body composed of sections of increasing weight, the aggregate weight of the sections being equal to that of the haulage-rope and the body suspended therefrom, said bodies being arranged to move simultaneously, but in opposite directions, and an abutment or stop in the path of the flexible body to limit its downward motion and cause it to accumulate thereon, substantially as and for the purposes specified.

3. The combination, with two bodies of substantially the same weight, movable simultaneously in reverse directions, the haulage-ropes from which said bodies are suspended, and a winding-drum for each of said ropes, of a flexible vertically-movable counterpoise whose weight is equal to that of the haulage-rope of one of the movable bodies, a stop in the path of the counterpoise to limit its downward motion, a winding-drum for said counterpoise, a driving-shaft common to all the winding-drums, and a reversing mechanism operating to reverse the movement of the counterpoise when the two bodies have reached the same altitude, substantially as and for the purposes specified.

4. The combination, with two bodies of substantially the same weight, movable simultaneously in reverse directions, the haulage-ropes from which said bodies are suspended, and a winding-drum for each of the haulage-ropes, of a flexible vertically-movable counterpoise made up of sections of increasing weight, the aggregate weight of said sections being equal to that of one of the haulage-ropes, or such haulage-rope and body suspended therefrom, a stop in the path of said counterpoise to limit its downward motion, a winding-drum therefor, a driving-shaft common to all the winding-drums, and a reversing mechanism operating to reverse the movement of the counterpoise when the two bodies have reached the same altitude, substantially as and for the purposes specified.

5. The combination, with two bodies of substantially the same weight, movable simultaneously in reverse directions, the haulage-ropes from which said bodies are suspended, and a winding-drum for each of the haulage-ropes, of a flexible vertically-movable counterpoise made up of sections of increasing weight, the aggregate weight of said sections being equal to that of one of the haulage-ropes, or such haulage-rope and body suspended therefrom, a stop in the path of said counterpoise to limit its downward motion, a winding-drum therefor, a driving-shaft common to all the winding-drums, and a reversing mechanism operating on the counterpoise to reverse its movement without reversing the rotation of the winding-drum, substantially as and for the purposes specified.

GEORGE LANSELL.

Witnesses:
WALTER SMYTHE BAYSTON,
WALTER CHARLES HART.